United States Patent Office 3,567,696
Patented Mar. 2, 1971

3,567,696
STORABLE POLYAMIDE-FORMING COMPOSITIONS AND PROCESS FOR THE PRODUCTION OF POLYAMIDES
Wilhelm August Sahler, Rheinbach, near Bonn, Germany, assignor to Dr. Plate GmbH, Chemische Fabrik, Bonn, Germany
No Drawing. Filed Mar. 6, 1968, Ser. No. 710,737
Claims priority, application Germany, Mar. 25, 1967, P 41,723
Int. Cl. C08g 20/18
U.S. Cl. 260—78        3 Claims

ABSTRACT OF THE DISCLOSURE

This invention relates to storable polyamide-forming compositions or mixtures of lactams comprising particular polymerization catalysts. Due to the particular polymerization catalysts the polyamide forming composition on the basis of polymerizable cyclic lactams may be stored at room temperature over prolonged periods of time and may nevertheless readily be polymerized by heating in the mould. This considerably simplifies the process for the production of polyamides from lactams.

---

It is known that lactams can be polymerized in the absence of water using alkaline catalysts, such as sodium caprolactam. Unfortunately, the reaction is so slow with conventional catalysts that it cannot be carried out in this way on an industrial scale. It is also known that the alkaline polymerization reaction can be accelerated very considerably by using so-called activators in addition to catalysts. The effect of the activators also enables the polymerization reaction to be carried out at low temperatures. This known procedure is, however, complicated by the necessity of using two systems. For example, it is common practice separately to prepare two lactam melts A and B, of which A additionally contains the catalyst and B the activator. The two component melts are mixed together and poured quickly into a mould heated to the polymerization temperature in which polymerization is subsequently completed. Mixing is inevitably accompanied by the entrainment into the mixture of air which, in the case of fairly large mouldings, is unable to escape because of the rapid completion of polymerization, with the result that cavities are formed in the moulding.

The object of the present invention is to provide new storable polyamide-forming compositions which avoid the use of two auxiliaries, such as catalyst and activator, in the polymerization of lactams and the disadvantages which this involves.

Another object of the present invention is to provide an improved process to carry out the high-speed polymerization of lactams for the production of mouldings in the presence of only one auxiliary that combines the properties of catalyst and activator in one substance.

Still other objects of the present invention and advantages thereof will become apparent as the description proceeds.

These objects can be achieved surprisingly readily and the process for polymerizing lactams is simplified very considerably if, in accordance with the invention, alkali-metal compounds of certain organic substances are used as catalysts. Accordingly, the present invention relates to storable polyamide-forming compositions of mixtures that can be polymerized under the influence of heat which mixtures comprise lactams, catalysts and optionally polymerization auxiliaries known per se, wherein the catalysts comprise and preferably consist of alkali-metal compounds of products corresponding to the following general Formula I:

(I)

in which $R_4$ represents oxygen or $=NOH$, and, when $R_4$ represents $=NOH$, $R_1$ represents an aromatic group and $R_2$ represents an acyloxy group, and, when $R_4$ represents oxygen, $R_1$ represents a group of the general Formula II:

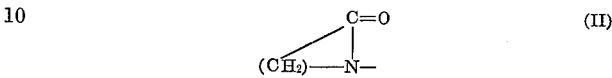
(II)

in which $n$ represents an integer from 5 to 11, or a group of the Formula III:

$$-O-R_3 \qquad (III)$$

in which $R_3$ represents an alkyl, aryl or aralkyl group, or $R_1$ represents the group $R_2$, and $R_2$ represents a group of the general formula

(IV)

in which $R_3$ has the same meaning as in Formula III, or when $R_1$ represents a group of Formula II, $R_2$ may also represent a group of the formula

(V)

in which Y represents hydrogen or $R_3$, and $R_3$ is as defined above, or $R_2$ represents a group of the formula

(VI)

in which Y has the meaning given above.

Aromatic groups as to $R_1$ are for instance and in particular the phenyl group and the lower alkyl phenyl groups such as the methyl phenyl, dimethyl phenyl, ethyl phenyl, n-propyl phenyl, isobutyl phenyl and tert.-butyl phenyl groups. Acyloxy groups as to $R_2$ are in particular the fatty acid groups having from 1 to 7, in particular 1 to 4 carbon atoms such as acetyloxy, propionyloxy, butyryloxy, capryloxy. Alkyl groups as to $R_3$ are for instance and in particular the lower alkyl groups having from 1 to 4 carbon atoms such a methyl, ethyl, n-propyl, isopropyl, n-butyl, isobutyl, and tert.-butyl. Aryl groups as to $R_3$ are in particular the phenyl and the lower alkylated phenyl groups such as methyl phenyl, dimethyl phenyl, ethyl phenyl, n-propyl phenyl and n-butyl phenyl. Aralkyl groups as to $R_3$ are in particular the phenyl lower alkyl groups such as benzyl, phenyl ethyl, omega-phenyl-n-propyl, beta-phenyl-beta-methyl-ethyl and omega-phenyl-n-butyl.

The following compounds are typical of the compounds that may be used for the purposes of the invention:

(1) Lactam-N-carboxylic acid amides or anilides.— These compounds correspond to general Formula I wherein $R_4$ represents oxygen, $R_1$ represents a group of general Formula II and $R_2$ represents a group of general Formula IV.

(2) N,N′-disubstituted ureas.—These compounds correspond to general Formula I wherein $R_4$ represents oxygen and $R_1$ and $R_2$ represent identical or different groups of general Formula IV.

(3) Urethanes.—These are compounds corresponding to general Formula I wherein $R_4$ represents oxygen, $R_1$ represents a group of Formula III and $R_2$ a group of Formula IV.

(4) Lactams substituted at the nitrogen with activated methylene groups in the side chain.— These compounds correspond to general Formula I in which $R_4$ represents oxygen, $R_1$ represents a group of Formula II and $R_2$ represents a group of Formula V or Formula VI.

(5) Acylated hydroxamic acids.—These compounds correspond to Formula I wherein $R_4$ represents the group =NOH, $R_1$ represents an aromatic group and $R_2$ represents an acyloxy group.

The alkali metal compounds of the substances referred to above are used as catalysts in accordance with the present invention. The alkali-free compounds are able to activate the polymerization of lactams in the presence of the known catalysts, for example, alkali metal lactams, amides, hydrides or oxides. Some of these alkali-free compounds are known to have an activating effect. However, the invention is not limited to the use of the alkali metal compounds of these known activators. In principle, any alkali metal compound of an organic compound which, in alkali free form, activates the polymerization of lactams in the presence of alkali metal lactams, amides, hydrides or oxides, may be used for the purposes of the invention. For example, it was hitherto unknown that lactams substituted at the nitrogen by groups containing hydrogen atoms replaceable by alkali metal atoms attached to activated methylene groups, could activate the polymerization of lactams in conjunction with the alkaline catalysts. Alkali metal compounds of these substituted lactams may also be used as catalysts for the purposes of this invention.

The last of the compounds just mentioned may be prepared by heating the lactams with the corresponding esters, for example diethyl malonate or aceto-acetic ester, under reflux until the theoretical quantity of alcohol has been distilled off. The resulting substituted lactams may then be purified by distillation in vacuo.

The alkali metal compounds that may be used as catalysts in accordance with the invention may with advantage be prepared by reacting equimolecular quantities of the alkali free starting compounds of Formula I with alkali metal alcoholates in alcoholic solution and evaporating the resulting solutions to dryness under reduced pressure. Some of the required alkali metal compounds are insoluble in alcoholic solution. This is true for example of the alkali-metal compounds of acylated hydroxamic acids which are precipitated on the addition of alkali metal alcoholate to the alcoholic solution. These compounds may then be separated from the solvent by filtration or centrifuging and dried. Another advantage of the alkali metal compounds of acylated hydroxamic acids is that they are not hygroscopic.

The quantity in which the catalysts are used is governed both by the type and reactivity of the lactams to be polymerized and by the catalytic activity of the catalysts. The most favourable quantities may readily be determined by simple tests. In any case, the quantities in question are catalytic quantities of up to 2%, based on the quantity of lactams to be polymerized.

Suitable lactams for the purposes of this invention include all those that can also be polymerized by conventional processes to form high molecular weight polyamides. Examples of such lactams include caprolactam, lauric lactam, capryllactam, oenanthic lactam and mixtures thereof. If desired, polymerization may be carried out in an inert gas atmosphere, as known per se for the production of polyamides.

Chain terminators, such as amines or alcohols, may be added to the starting compounds as polymerization auxiliaries, as known per se.

According to the present invention, sodium and/or potassium compounds are preferably used as catalysts, on economic grounds.

One particular advantage of the storable polyamide-forming compositions or mixtures of lactams and catalysts according to the invention is that they may readily be prepared by mixing the starting lactams with the catalysts and, optionally, other standard polymerization auxiliaries, after which they can be stored for as long as may be desired and then dispatched to the consumer. The consumers of these products thus receive a one-component system which may be polymerized to give polyamide mouldings simply by heating, without any need for other components to be added. It is possible because of the characteristic of the storable poly-amide forming compositions or mixtures according to the invention to carry out high-speed polymerization in an extremely simple manner. For example, the lactam may be ground with a catalytic quantity of a catalyst according to the invention; the resulting powder can be stored for long periods, mostly of unlimited length; and polymerization can be initiated by fusing the catalyzed mix in a mould and bringing the melt to the most favourable polymerization temperature by the further supply of heat. Polymerization is then completed very quickly, usually in a matter of minutes. Solid blocks of polyamide may be produced in this way. In the case of large mouldings, the powder introduced is with advantage compacted and then fused in vacuo.

The melting temperature of course depends upon the particular lactam compound. The polymerization temperature, too, depends upon the particular lactam to be polymerized and the particular catalyst. It may range between 150° C. and 250° C. The preferred range is between 170° C. and 200° C.

The invention is further illustrated by the following examples without however limiting the same thereto:

EXAMPLE 1

A powder comprising 20 g. of lauric lactam and 0.2 g. of sodium acetylbenzhydroxamic acid is poured into a cold mould which is then immersed in a heating bath heated to 178° C. The lactam melts and is polymerized at once. In the case of relatively small mouldings, no air bubbles are present because they are able to escape from the melt which is initially of low viscosity. The whole is left standing in the bath for 30 minutes and then cooled. The polymer has a relative viscosity of 1.75, as measured on a 0.5% by weight solution in m-cresol (viscosity was similarly measured in the following examples). In order to avoid the formation of air bubbles in fairly large mouldings, the starting material is preferably tamped into the mould, and the mould itself placed under a vacuum strong enough to avoid inclusions of air.

A solid block of polyamide is obtained on cooling.

EXAMPLE 2

20 g. of lauric lactam are fused at 190° C., followed by the addition to the resulting melt of 0.25 g. of the disodium compound of N,N-di-methylurea. The mixture is then cooled very quickly in order to prevent polymerization, after which it may be size-reduced if desired. To initiate polymerization the product is reheated to around 190° C. Polymerization begins after an interval of some 5 minutes. After 8 minutes the melt is of such high viscosity that filaments can be spun from it. After a total residence time of 30 minutes at 190° C. in a heating bath, the product is left to cool. The polymer has a relative viscosity of 1.7.

EXAMPLE 3

20 g. of caprolactam are mixed with 0.3 g. of the sodium compound of caprolactam-N-carboxylic acid anilide. The mixture is fused in a glass polymerization vessel by immersing the vessel in a heating bath heated to 180° C. The melt immediately turns pale yellow in color. After some 3 minutes, it is highly viscous and can no longer be poured out. After a residence time of 30 minutes in the heating bath, the product is cooled. It has a relative viscosity of 1.8.

EXAMPLE 4

A powder of 10 g. of caprolactam, 10 g. of lauric lactam and 0.2 g. of the disodium compound of 1,3-bis- (4-methyl-3-carbethoxoamidophenyl)-uretdione is fused at a bath temperature of 180° C. as described in Example 1. After a few seconds, a highly viscous melt is obtained which is cooled after a residence time in the heating bath of 30 minutes. The polymer has a relative viscosity of 1.65.

EXAMPLE 5

A mixture of 18 g. of lauric lactam, 2 g. of capryllactam and 0.2 g. of the monosodium compound of cyanoacetylcaprolactam is finely ground and fused as described in the preceding examples, at a bath temperature of 175° C. Polymerization begins after some 5 minutes. After a residence time in the bath of 30 minutes, the product is cooled. The polymer has a relative viscosity of 1.7.

EXAMPLE 6

20 g. of caprolactam and 0.2 g. of the monosodium compound of N,N-ethylene-(3-carbethoxoamido-4-methylphenyl)urea are ground together and the resulting powder is fused as described above. The bath temperature is 180° C. After a residence time of 30 minutes, a polymer with a relative viscosity of 1.6 is obtained.

EXAMPLE 7

20 g. of capryllactam are fused together with 0.2 g. of the dipotassium compound of acetoacetyl caprolactam at a bath temperature of 180° C., and the resulting melt is briefly stirred and left for 30 minutes in a heating bath. There is a marked rise in the viscosity of the melt after only a few seconds. After cooling, the relative viscosity of the polymer in m-cresol is measured and amounts to 1.95.

What I claim is:

1. A storable polyamide-forming composition that can be polymerized under the influence of heating at 175° C. to 190° C. which composition consists essentially of a lactam and as a lactam polymerization catalyst an alkali metal compound of the product of the Formula I:

  (I)

in which $R_1$ represents a member selected from the group consisting of the groups of the Formula II:

  (II)

in which $n$ is an integer from 5 to 11; the groups of the Formula III:

$$-O-R_3 \quad (III)$$

in which $R_3$ represents a member selected from the group consisting of the lower alkyl groups having from 1 to 4 carbon atoms, the phenyl group, the lower alkylated phenyl groups, and the phenyl lower alkyl groups; and the groups of Formula IV:

  (IV)

in which $R_3$ has the same meaning as in Formula III, and $R_2$ represents a member selected from the group consisting of the groups of Formula IV in which $R_3$ has the same meaning as in Formula III; and, when $R_1$ represents a group of Formula II, $R_2$ may also represent a member selected from the group consisting of the groups of the Formula V:

  (V)

in which Y represents a member selected from the group consisting of hydrogen and $R_3$, $R_3$ being as defined above, and the groups of the Formula VI:

  (IV)

in which Y has the meaning given above.

2. A composition as claimed in claim 1 additionally comprising in combination a known polymerization auxiliary.

3. A composition as claimed in claim 1, wherein the catalyst is a member selected from the group consisting of the sodium and potassium compounds of the products of Formula I and the mixtures thereof.

References Cited

UNITED STATES PATENTS 3,309,343  3/1967  Darnell et al. _____ 260—78L

WILLIAM H. SHORT, Primary Examiner

L. M. PHYNES, Assistant Examiner

PO-1050
(5/69)

UNITED STATES PATENT OFFICE
CERTIFICATE OF CORRECTION

Patent No. 3,567,696     Dated March 2, 1971

Inventor(s) Wilhelm August Sahler

It is certified that error appears in the above-identified patent and that said Letters Patent are hereby corrected as shown below:

Column 1, Line 68, change the word "of" to -- or --.

Column 2, Line 10, change the structural formula from

"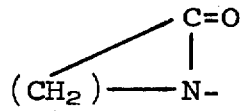"

to

--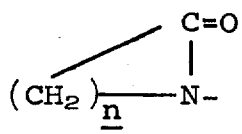--

Signed and sealed this 15th day of June 1971.

(SEAL)
Attest:

EDWARD M. FLETCHER, JR.
Attesting Officer

WILLIAM E. SCHUYLER, JR.
Commissioner of Patents